United States Patent
Turner et al.

(10) Patent No.: US 8,116,028 B2
(45) Date of Patent: *Feb. 14, 2012

(54) CARTRIDGE LOADING DEVICES

(75) Inventors: Philip Turner, Bristol (GB); Mark Dillon, Bristol (GB); Andrew Mark Fernihough, Bath (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1145 days.

This patent is subject to a terminal disclaimer.

(21) Appl. No.: 11/250,856

(22) Filed: Oct. 14, 2005

(65) Prior Publication Data

US 2006/0092553 A1     May 4, 2006

(30) Foreign Application Priority Data

Oct. 28, 2004   (GB) .................................. 0424025.5

(51) Int. Cl.
 *G11B 5/008*  (2006.01)
 *G11B 15/675*  (2006.01)
(52) U.S. Cl. ...................... 360/94; 360/96.51
(58) Field of Classification Search ............ 360/94, 360/96.5, 96.51
 See application file for complete search history.

(56) References Cited

U.S. PATENT DOCUMENTS

| | | | |
|---|---|---|---|
| 4,603,362 A | 7/1986 | Sendelweck | |
| 5,124,854 A | 6/1992 | Iyota et al. | |
| 5,450,259 A | 9/1995 | Cho et al. | |
| 5,558,291 A * | 9/1996 | Anderson et al. | 242/336 |
| 5,793,565 A * | 8/1998 | Suzuki | 360/94 |
| 5,822,149 A * | 10/1998 | Takase et al. | 360/94 |
| 5,890,669 A | 4/1999 | Buckland et al. | |
| 5,923,497 A * | 7/1999 | Suzuki | 360/96.5 |
| 7,349,177 B2 * | 3/2008 | Turner et al. | 360/94 |
| 7,420,768 B2 * | 9/2008 | Turner et al. | 360/96.51 |
| 7,440,226 B2 * | 10/2008 | Turner et al. | 360/94 |
| 2007/0091502 A1 * | 4/2007 | Murase et al. | 360/85 |

FOREIGN PATENT DOCUMENTS

| | | |
|---|---|---|
| EP | 0 415 411 A2 | 8/1990 |
| EP | 0 807 933 A1 | 11/1997 |
| JP | 09265700 A | 10/1997 |
| JP | 2000306297 A | 11/2000 |
| JP | 2003022595 A | 1/2003 |

OTHER PUBLICATIONS

U.S. Appl. No. 11/251,510, Non-Final Rejection dated Nov. 27, 2007, pp. 1-9.
U.S. Appl. No. 11/251,510, Notice of Allowability, p. 1, Dated May 9, 2008.

(Continued)

*Primary Examiner* — Will J Klimowicz

(57) ABSTRACT

A cartridge loading device 10 for magnetic tape cartridges comprises a first member 12, a second member 14 and a guide arrangement 30, 32, 36, 38 for guiding movement of said second member relative to said first member from a first position to a second position. The first and second members cooperate when in the first position to define a first sized opening having a height sized to receive first sized magnetic tape cartridges having a predetermined height and, when in the second position, cooperating to define a second sized opening that has a height that is greater than the height of the first sized opening and is sized to receive second sized magnetic tape cartridges having a predetermined height that is greater than the height of the first sized magnetic tape cartridges.

18 Claims, 1 Drawing Sheet

OTHER PUBLICATIONS

U.S. Appl. No. 11/250,657, Non-Final Rejection dated Nov. 13, 2007, pp. 1-9.
U.S. Appl. No. 11/250,657, Non-Final Rejection dated Mar. 18, 2008, pp. 1-5.
U.S. Appl. No. 11/250,657, Notice of Allowability and Examiner's Amendment, pp. 1-4, Dated Jul. 22, 2008.
U.S. Appl. No. 11/251,387, Notice of Allowability and Examiner's Amendment, pp. 1-7, Dated Nov. 30, 2007.

* cited by examiner

CARTRIDGE LOADING DEVICES

FIELD OF THE INVENTION

The invention relates to a cartridge loading device for magnetic tape cartridges used for storage of digital data.

BACKGROUND TO THE INVENTION

Magnetic tape is commonly used for storage of digital data. The magnetic tape is spooled on at least one reel in a cartridge that is insertable into a digital data transfer apparatus in which data can be written onto the tape and/or data can be read from the tape. Such data transfer apparatus, which may be referred to as a tape drives, typically includes a tape head for one or both of reading and/or writing data from or to the tape head.

Known tape drives are generally designed to use a predetermined size tape cartridge that contains a tape having a known width. Known cartridge loading devices of tape drives are generally designed to be used with a particular size of cartridge. Such devices conventionally include means for ensuring that only cartridges of the correct size can be inserted and then only when the cartridge is correctly oriented. A feature of known cartridge loading devices is that they are made rigid so that cartridges of the wrong size or incorrectly oriented cartridges cannot be forced into the tape drive, except by the exertion of an unnatural amount of force.

One format for data storage in a helical scan tape drive is Digital Data Storage (DDS). Various versions of DDS exist, but each version uses the same width tape in Digital Audio (DAT) cartridges, including DAT72 and DAT160. The tape width is approximately 4 mm. There is a demand for more and more data storage capacity. This has, to some extent, been met by improved reading and writing techniques that have allowed increased amounts of data to be stored, without changing the tape length or width. However, ultimately, the storage capacity of a given size of tape has a limit.

One solution to the problem of data storage capacity is to increase the width of the tape. Of course, a greater width provides more storage capacity. However, since the cartridge loading devices of tape drives are designed to accept a particular size cartridge, if wider tapes are used, tape drives with loading devices able to accept a larger cartridge must be provided. This then provides the user with the problem that legacy format tape cartridges would not be usable with the new tape drive and so it would be necessary to maintain more than one tape drive or transfer existing stored data to the wider tape.

SUMMARY OF THE INVENTION

The invention provides a cartridge loading device for magnetic tape cartridges, said device comprising a first member, a second member and a guide arrangement for guiding movement of said second member relative to said first member from a first position to a second position, said first and second members cooperating when in said first position to define a first sized opening having a height sized to receive first sized magnetic tape cartridges having a predetermined height and, when in said second position, cooperating to define a second sized opening having a height that is greater than the height of said first sized opening and said second sized opening being sized to receive second sized magnetic tape cartridges having a predetermined height that is greater than the height of said first sized magnetic tape cartridges.

The invention provides a cartridge loading device for magnetic tape cartridges comprising housing means defining a housing for magnetic tape cartridges, said housing means being controllably expandable from a first size to a second size, said first size having a first height and said second size having a second height, said second height being greater than said first height and said sizes being selected such that said housing can receive magnetic tape cartridges of two different predetermined sizes for loading into a digital data storage device.

BRIEF DESCRIPTION OF THE DRAWINGS

In order that the invention may be well understood, an embodiment thereof, which is given by way of example only, will now be described with reference to the drawings, in which.

DETAILED DESCRIPTION

Figure 1:
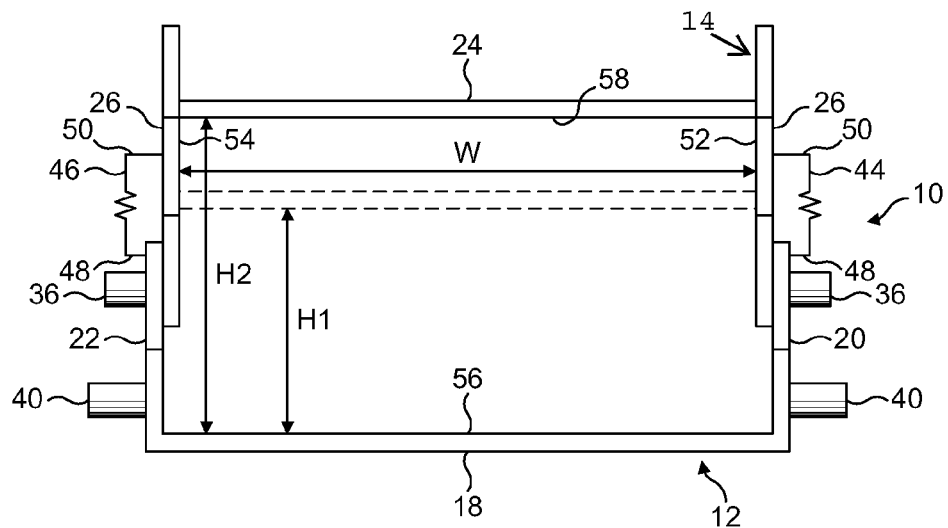
FIG. 1 is a front elevation of a cartridge loading device in one condition.

Referring to FIG. 1, a cartridge loading device 10 for magnetic tape cartridges used for storage of digital data comprises a first member 12 and a second member 14. Each member 12, 14 comprises a generally U-shaped channel and the two channels are oppositely disposed so as to define a housing for magnetic tape cartridges that has a substantially rectangular opening 16.

The U-shaped channel of the first member 12 comprises a horizontally disposed base or floor portion 18 and opposed upstanding limbs 20, 22 that extend perpendicular to the base portion 18. The U-shaped channel of the second member 14 comprises a horizontally disposed upper or roof portion 24 and opposed depending limbs 26, 28 that extend perpendicular to the roof portion and parallel to the limbs 20, 22 of the first member 12. The arrangement is such that the limbs 26, 28 of the second member are disposed inside of, and adjacent and parallel to, the respective limbs 20, 22 of the first member 12.

The limbs 20, 22 of the first member 12 are each provided with two elongate slots 30, 32 that are upwardly inclined towards the rear 34 of the cartridge loading device 10. The limbs 26, 28 of the second member 14 are each provided with outwardly projecting pins 36, 38 that project through the respective slots 30, 32 and can slide back and forth in the slots. The slots 30, 32 and pins 36, 38 constitute a guide arrangement that guides movement of the second member 14 relative to the first member 12.

The limbs 20, 22 of the first member 12 are fitted with a set of outwardly projecting pins 40, 42 by which the cartridge loading device 10 is located in a digital data transfer apparatus, or tape drive (not shown).

Figure 2:
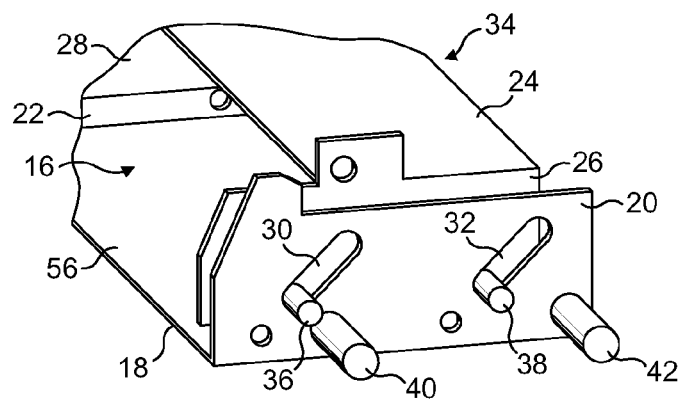
FIG. 2 is a perspective view of the cartridge loading device of FIG. 1 in another condition.

The first and second members 12, 14 are held together in the condition shown in FIG. 2 by a spring biasing arrangement. By way of example, tension springs 44, 46 are shown connected at their ends to respective pins 48, 50 provided on the limbs of the first and second members 12, 14. It is to be understood that the arrangement of springs and pins shown in FIG. 1 is purely schematic. The springs and pins have been omitted from FIGS. 2 and 3 for the sake of clarity. As another alternative, springs might be attached to one or more of the pins 36, 38 and respective attachment portions, such as lugs, on the first member 12. It is also to be understood that other forms of spring biasing can be used and that the biasing of the two members 12, 14 can be achieved by means other than springs.

The normal condition of the cartridge loading device is as shown in FIG. 2. In this condition, the second member 14 is pulled down towards the first member 12 so that the pins 36, 38 are at the lower ends of the respective slots 30, 32. In this condition, and referring to FIG. 1, the opening 16 has a size determined by the distance W between the inner surfaces 52, 54 of the limbs 26, 28 of the second member 14 and the distance H1 between the inner surface 56 of the floor 18 and the inner surface 58 of the roof 24, which for the FIG. 2 condition is shown by dashed lines in FIG. 1. The first sized opening 16 thus described is a relatively narrow opening for cartridges containing a relatively narrow width tape. Typically, the first sized opening might be for a 4 mm tape cartridge.

Figure 3:
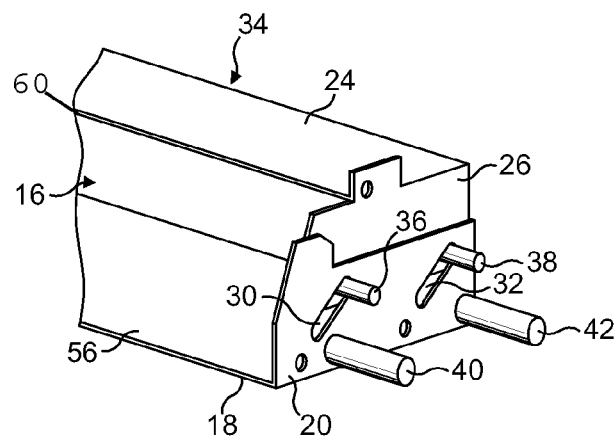
FIG. 3 is a perspective view of the cartridge loading device in the same condition as in FIG. 1.

By virtue of the permitted movement of the second member 14 relative to the first member 12, the size of the opening 16 can be increased to accept a larger cartridge. Typically, the larger cartridge might be an 8 mm tape cartridge. When a larger cartridge is inserted into the opening 16 with the cartridge loading device 10 in the condition shown in FIG. 2, the force applied to the second member 14 pushes the second member upwardly and towards the rear 34 of the device. The movement of the second member relative to the first member is guided by the pins 36, 38 sliding in the slots 30, 32. The guide arrangement is configured such that with the pins 36, 38 at the upper ends of the slots 30, 32 (as shown in FIG. 3), the size of the opening 16 is increased to a second size, just large enough to receive the larger size cartridge. The second size opening has a width W equal to that of the first size opening. However, the height of the opening is increased to H2. The second size opening is thus able to accommodate a larger size cartridge, such as an 8 mm tape cartridge, having a relatively wider tape than the cartridge that can be received in the first size opening.

In the illustrated embodiment, the slots 30, 32 are inclined at an angle of 45° to the horizontal, i.e. to the floor 18. It will be appreciated that the angle of inclination can be varied. However, 45° is preferred, since if the angle is steeper, the force required to move the second member from the position shown in FIG. 2 to the position shown in FIG. 3 is increased, while if the angle of inclination is made less steep, the movement of the second member is made too long.

When a larger size cartridge is removed from the opening 16 of the cartridge loading device 10, the springs 44, 46 pull the second member 14 down towards the floor 18 of the first member. The springs are selected to have sufficient spring force to reliably return the device to the FIG. 2 condition. It will be appreciated that the springs should not be overly stiff, as this would increase the force required to move the second member 14 away from the first member 12 to permit insertion of the larger size cartridge and produce an unnecessarily harsh closing action.

The first and second members 12, 14 are preferably made from a metal, such as steel. Steel components are preferably treated to prevent corrosion.

In order to facilitate the upward movement of the second member 14 relative to the first member 12, it may be desirable to provide an inclined, or ramp-like, lead-in to the opening 16. By way of an example, the leading edge 60 (FIG. 3) of the roof 24 of the second member could be provided with a plastics member, or members, that provide an inclined lead-in to the opening 16. The plastics member(s) might, for example, comprise a body comprising a groove for fitting to the leading edge 60 (preferably the groove would be sized to be a push-fit) with a ramp-like front surface opposite to the side provided with the groove. The inclination of the ramp-like surface would be down towards the floor 18 of the first member and towards the rear of the cartridge loading device 10.

It will be understood that although the embodiment has two members 12, 14 arranged such that the upper of the two moves upwardly with respect to the lower, it is equally possible to have an arrangement in which the lower member moves downwardly with respect to the upper member.

In the embodiment, the slots 30, 32 are straight so that the movement of the second member is along a straight line. However, this is not essential and the slots could instead comprise a curve.

In the embodiment, the guide arrangement comprises pins on one member received in slots in the other member. However, any suitable arrangement may be used. For example, projections received in recesses, a parallel linkage arrangement or a pinion gear running around an arcuate gear segment are all arrangements that could be used.

In referring to the height H1, H2 of the first and second sized openings, it is to be understood that this does not have to be uniform across the width of the opening. The height is the distance between a portion of the first member and an opposed portion of the second member that controls whether a cartridge which the opening is intended to receive can actually be received. The height might be the spacing between two plane surfaces as shown in FIG. 1. However, as an example of an alternative arrangement, the roof portion 24 might be provided with one or more projections facing the floor portion 18 and it would be the distance between the projection, or projections, and the floor portion that would represent the height and determine the height of cartridge that can be received in the opening.

It will be understood that the first member 12 and second member 14 can be provided with ribs or grooves configured to mate with ribs or grooves on a cartridge that are arranged to ensure that the cartridge is inserted in the correct orientation. For example, a rib, or projection, might be provided on the floor portion 18 to one side of the centerline of the opening 18. This would be positioned such that provided the cartridges the opening is intended to receive are correctly oriented when inserted into the opening, the rib will be received in a groove, or recess, in the cartridge. As is known, such an arrangement can ensure that cartridges can only be inserted into the opening when correctly oriented.

The invention claimed is:

1. A cartridge loading device for magnetic tape cartridges, said device comprising a first member, a second member and a guide arrangement for guiding movement of said second member relative to said first member from a first position to a second position, said first and second members cooperating when in said first position to define a first sized opening having a height sized to receive first sized magnetic tape cartridges having a predetermined height and, when in said second position, cooperating to define a second sized opening having a height that is greater than the height of said first sized opening, said second sized opening being sized to receive second sized magnetic tape cartridges having a predetermined height that is greater than the height of said first sized magnetic tape cartridges, said guide arrangement comprising at least one projection on one of said first and second members engaging in an elongate recess therefor provided in the other of said first and second members.

2. A device as claimed in claim 1, wherein said first and second members each comprise a generally U-shaped channel, the U-shaped channels being oppositely disposed such that the openings are substantially rectangular.

3. A device as claimed in claim 1, further comprising at least one device for biasing said members to said first position.

4. A device as claimed in claim 3, wherein said at least one device includes a spring.

5. A device as claimed in claim 1, wherein said at least one projection comprises two sets of oppositely directed pins provided on said second member and engaging in respective elongate slots provided in said first member.

6. A device as claimed in claim 1, wherein said guide arrangement is such that said movement of said second member relative to said first member is inclined with respect to said openings.

7. A device as claimed in claim 6, wherein said inclined movement has vertical and horizontal components that are equal.

8. A device as claimed in claim 1, wherein said first sized opening has a width and said second sized opening has a width and said widths are substantially equal.

9. A digital data transfer apparatus comprising a cartridge loading device for magnetic tape cartridges as claimed in claim 1.

10. A cartridge loading device for loading magnetic tapes having different heights comprising:
   a first channel member having opposed first side members connected by a first transverse member;
   a second channel member having opposed second side members connected by a second transverse member, said first transverse member being disposed opposite said second transverse member such that a respective first side member is disposed opposite and adjacent a respective second side member and the distance between said first and second transverse members defines the height of an opening created by said first and second channel members; and
   a guide arrangement having first guide parts provided on said first side members and second guide parts provided on said second side members, the second guide parts of the second side members being engageable by the first guide parts of the adjacent first side members, said guide arrangement to guide movement of one of said first channel member and said second channel member relative to the other of said first channel member and said second channel member from a first position to a second position such that if in said first position, said opening is sized to receive a magnetic tape cartridge having a first height, and if in said second position, said opening is sized to receive a magnetic tape cartridge having a second height that is greater than said first height.

11. A device as claimed in claim 10, wherein said first guide parts comprise projections and said second guide parts comprise respective elongate recesses for receiving said projections.

12. A device as claimed claim 10, further comprising at least one resilient biasing element for biasing said second member to said first position.

13. A housing of a cartridge loading device that can receive magnetic tape cartridges of two different predetermined sizes for loading into a digital data storage device comprising:
   two members arranged for relative movement to permit controlled expansion from a first size to a second size, said first size having a first height and said second size having a second height, said second height being greater than said first height;
   a guide arrangement having at least one elongate slot in one of the two members and a pin in the other of the two members, said pin disposed in said slot to enable the relative movement between said two members, the relative movement being a sliding motion of one of the two members with respect to the other of the two members, said guide arrangement also to define said first and second heights; and
   an adjustable opening corresponding with said first and second heights such that if said two members are at said first size the opening is sized to receive a first magnetic tape cartridge having a first predetermined size, and if said two members are at said second size the opening is sized to receive a second magnetic tape cartridge having a second predetermined size that is greater than the magnetic tape cartridge having the first predetermined size.

14. The device of claim 13, further comprising biasing means for biasing said two members to said first size.

15. The device of claim 13 wherein said guide arrangement comprises two elongate slots in one of the two members and two pins in the other of the two members, each of said two pins disposed in a corresponding one of said two slots to enable said sliding motion.

16. The device of claim 15 wherein each of the two members is U-shaped having a base and arms perpendicular to the base, one of the two elongate slots disposed in each arm of the one of the two members, at an angle to the base.

17. The device of claim 16 wherein the two elongated slots are at a 45 degree angle to the base.

18. The device of claim 16 wherein each of the two elongated slots has a first end and a second end, and wherein the two members are disposed opposite each other such that the bases are separated by said first height if the two pins are located at the first end of the corresponding elongated slots and the bases are separated by said second height if the two pins are located at the second end of the corresponding elongated slots.

\* \* \* \* \*

UNITED STATES PATENT AND TRADEMARK OFFICE
CERTIFICATE OF CORRECTION

| | | |
|---|---|---|
| PATENT NO. | : 8,116,028 B2 | Page 1 of 1 |
| APPLICATION NO. | : 11/250856 | |
| DATED | : February 14, 2012 | |
| INVENTOR(S) | : Philip Turner et al. | |

It is certified that error appears in the above-identified patent and that said Letters Patent is hereby corrected as shown below:

In column 6, line 1, in Claim 12, delete "claimed claim" and insert -- claimed in claim --, therefor.

Signed and Sealed this
Sixth Day of November, 2012

David J. Kappos
*Director of the United States Patent and Trademark Office*